(12) United States Patent
Sumner et al.

(10) Patent No.: US 11,017,144 B2
(45) Date of Patent: May 25, 2021

(54) FORM BOARD MERGE

(71) Applicants: Mentor Graphics Corporation, Wilsonville, OR (US); Mentor Graphics Development (Deutschland) GmbH, Wilsonville, OR (US)

(72) Inventors: Alexander Sumner, Chorley (GB); Frank Hemmersbach, Frechen (DE); Mohamed El-Morsy, Sale (GB); Adam Bedford, Preston (GB); Vikas Maddukuri, Altrincham (GB)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/505,181

(22) Filed: Jul. 8, 2019

(65) Prior Publication Data
US 2020/0012758 A1   Jan. 9, 2020

Related U.S. Application Data

(60) Provisional application No. 62/694,773, filed on Jul. 6, 2018.

(51) Int. Cl.
*G06F 30/392* (2020.01)

(52) U.S. Cl.
CPC ................. *G06F 30/392* (2020.01)

(58) Field of Classification Search
CPC ..................................... G06F 30/392
USPC ......................................... 716/119
See application file for complete search history.

(56) References Cited

U.S. PATENT DOCUMENTS

| | | | |
|---|---|---|---|
| 2003/0020715 A1* | 1/2003 | Sakakura | G06T 15/00 345/424 |
| 2016/0224691 A1* | 8/2016 | Maddukuri | G06F 30/18 |

* cited by examiner

*Primary Examiner* — Eric D Lee (57) ABSTRACT

This application discloses a computing system to merge a first form board design describing a configuration for use in manufacturing a first wire harness with a second form board design describing a configuration for use in manufacturing a second wire harness. The computing system places the first form board design into a merged form board design, matches portions of the second form board design to portions of the first form board design, and aligns the second form board design with the merged form board design based on the matches. The computing system places an unmatched portion of the second form board design in the merged form board design based on the alignment of the second form board design with the merged form board design. The merged form board design describes a form board configuration for use in manufacturing both the first wire harness and the second wire harness.

20 Claims, 6 Drawing Sheets

PLATFORM DESIGN FLOW

FORM BOARD MERGE

RELATED APPLICATION

This patent application claims priority to U.S. Provisional Patent Application No. 62/694,773, filed Jul. 6, 2018, which is incorporated by reference herein.

TECHNICAL FIELD

This application is generally related to electronic design automation and, more specifically, to performing a form board merge for wire harness manufacturing.

BACKGROUND

The design of electrical and electronic systems or interconnects, such as wiring harnesses for implementation into vehicles, aircraft, boats, appliances, or other systems with distributed electronics, can include many different design stages or phases at different levels of abstraction. For example, some of the design phases can include a requirements phase, a functional phase, a logical phase, a physical or wiring phase, a components phase, which can include at least one of a topology section, a harness section, or the like, a form board or manufacturing phase, and a service phase.

The form board or manufacturing phase can utilize a harness development tool to generate designs for form boards utilized by wire harness manufacturers to assemble wire harnesses. These form boards have a 1-to-1 relationship to corresponding wire harness designs, meaning that each form board has a configuration allowing the manufacture of one corresponding wire harness design. In an attempt to efficiently utilize factory space and production line resources, some wire harness manufacturers manually design a form board that can accommodate multiple wire harness designs corresponding to different wire harnesses. For example, a wire harness manufacturer can identify multiple form boards that appear to be combinable into a single form board, often called a merged form board, by employ drawing tools to manually merge the designs of the identified form board into a design for the merged form board. This manual merger of form board designs into a merged form board design can be a time consuming and error prone process, for example, wire harness manufacturers may undertake the manual merger of multiple form board designs only to subsequently determine that generating a design for a merged form board is impractical or impossible. Furthermore, the manual merger of form board designs with a drawing toolo breaks data-continuity of the design flow, for example, does not include links between the merged form board and the design of the wire harnesses to be manufactured, which can complicate change management and any subsequent production line optimization.

SUMMARY

This application discloses a computing system to merge a first form board design describing a configuration for use in manufacturing a first wire harness with a second form board design describing a configuration for use in manufacturing a second wire harness. The computing system can place the first form board design into a merged form board design, match portions of the second form board design to portions of the first form board design, align the second form board design with the merged form board design based on the matches, and merge the matching portions of the second form board design into the merged form board design based on the alignment. The computing system can place an unmatched portion of the second form board design in the merged form board design based on the alignment of the second form board design with the merged form board design. The merged form board design describes a form board configuration for use in manufacturing both the first wire harness and the second wire harness. Embodiments will be described in greater detail below.

DETAILED DESCRIPTION

Illustrative Operating Environment

Figure 1:
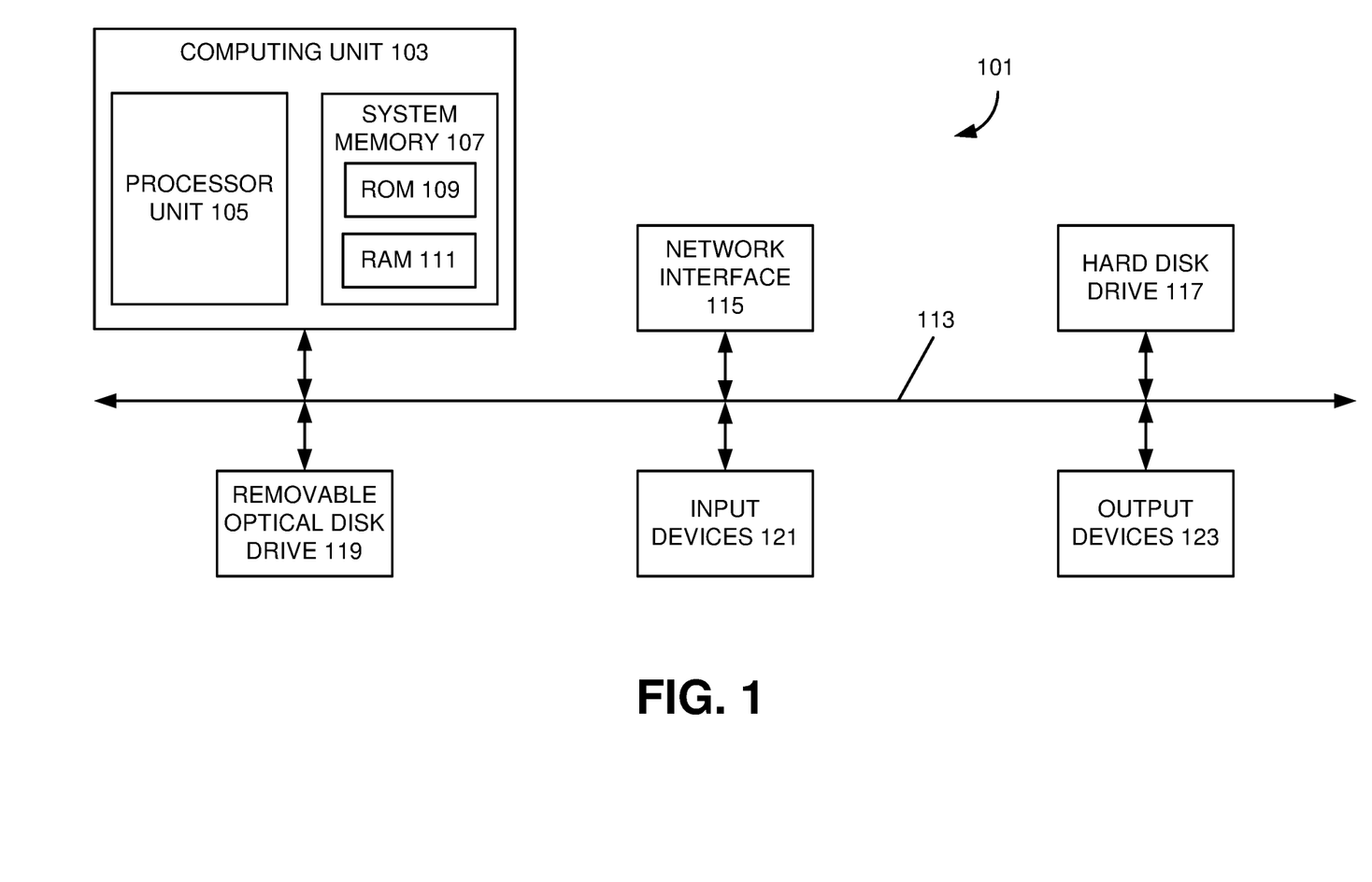
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
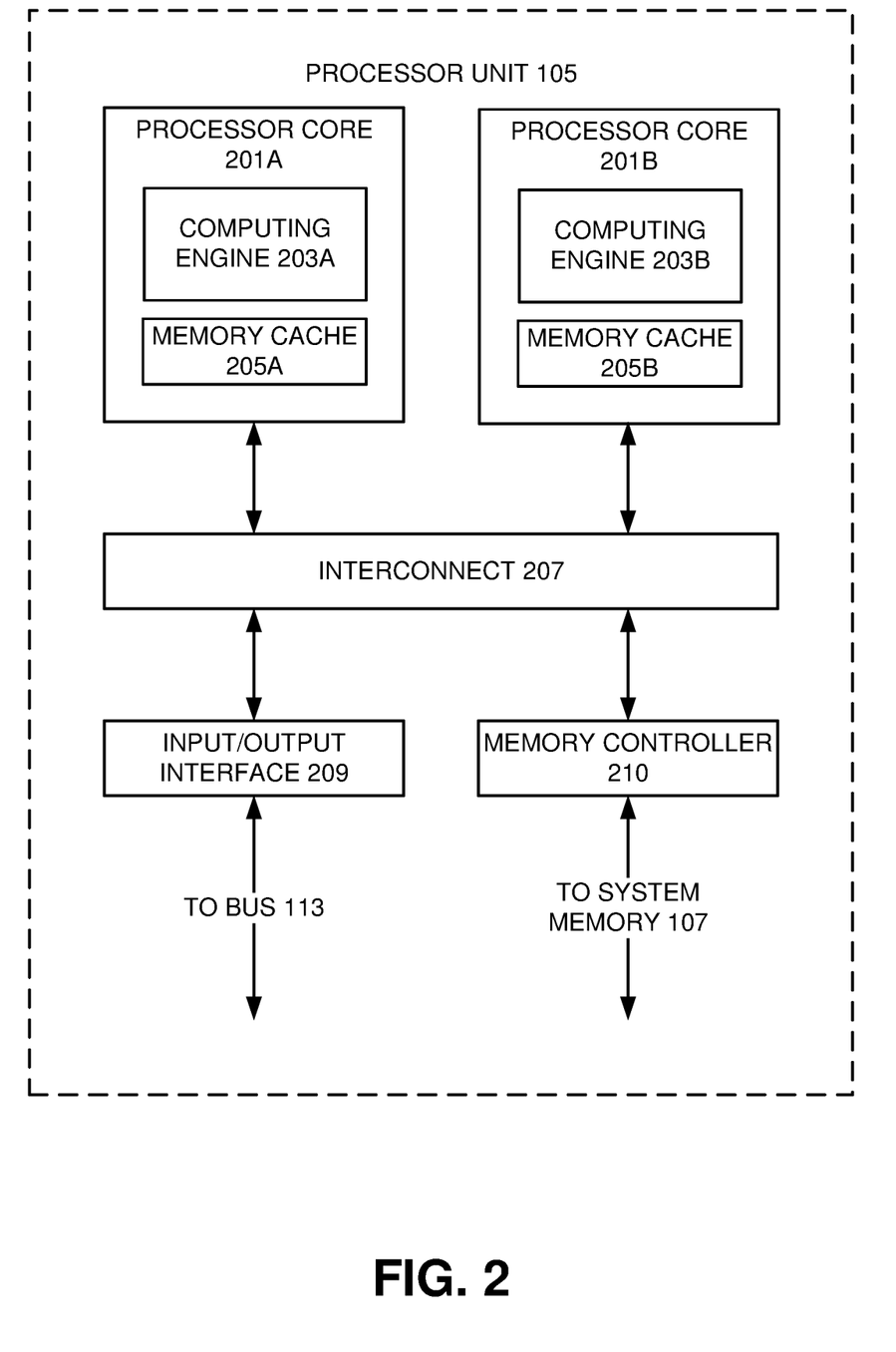

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Illustrative Platform Design System

Figures 3A, 4:
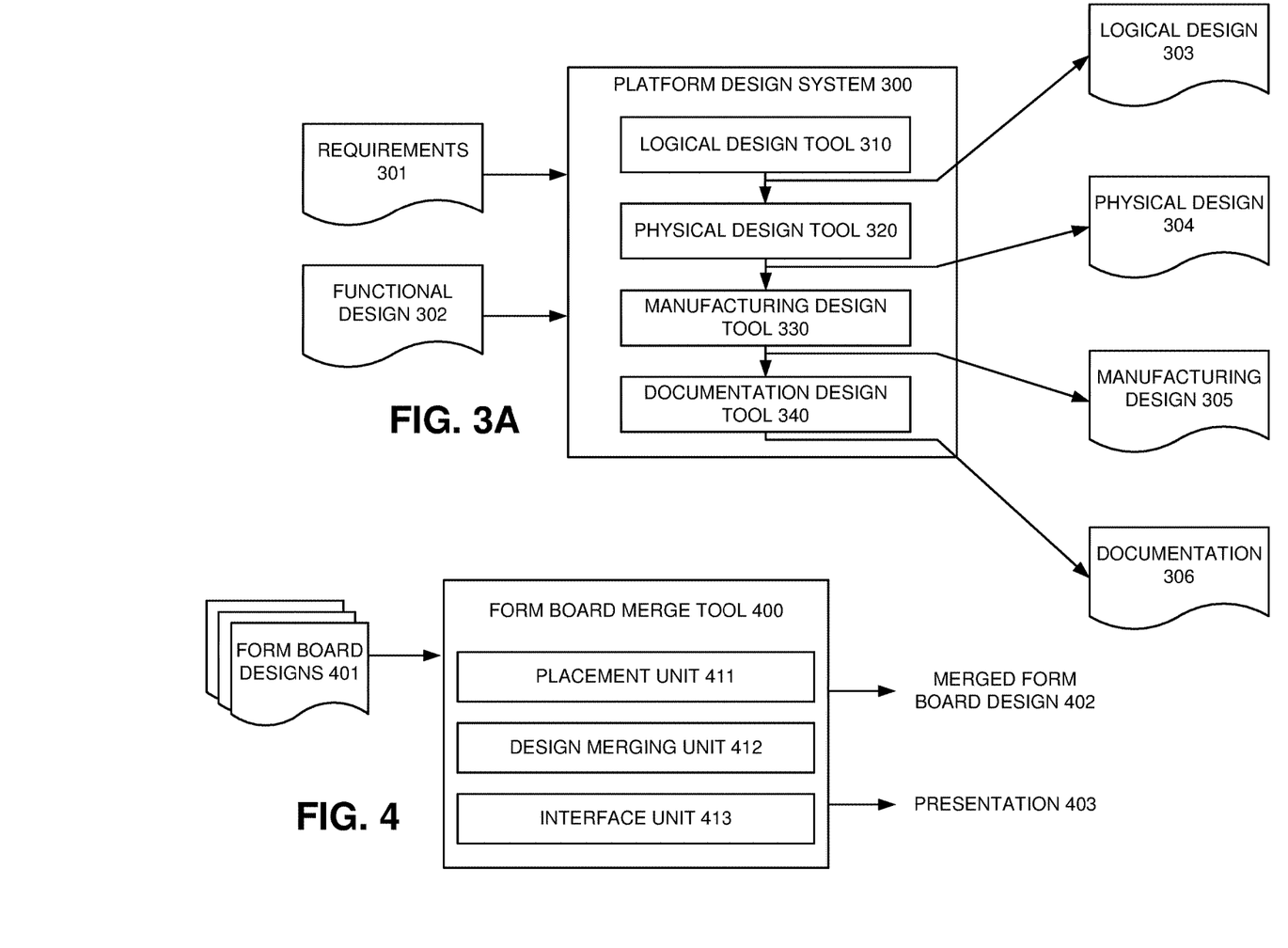
FIGS. 3A and 3B illustrate an example platform design system according to various embodiments.
FIG. 4 illustrates an example form board merge tool according to various embodiments.
Figure 3B:
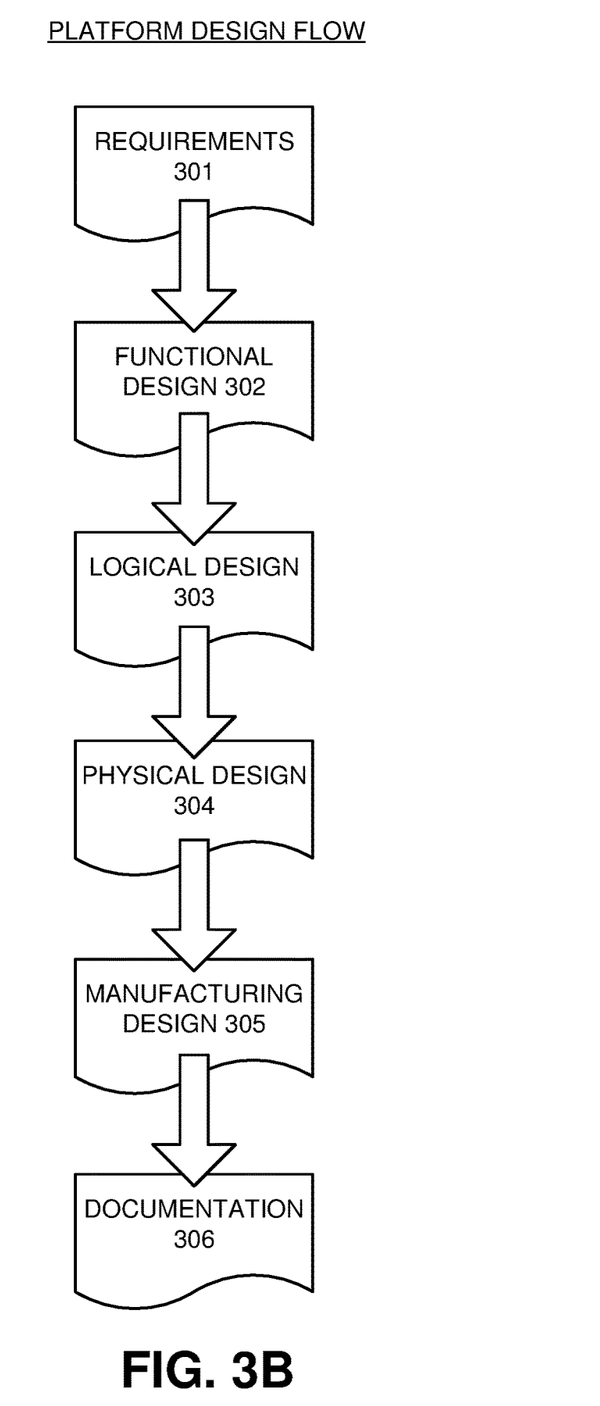

FIGS. 3A and 3B illustrate an example platform design system 300 according to various embodiments. Referring to FIGS. 3A and 3B, the platform design system 300 can include a set of one or more tools to develop at least a portion of an electronic system, such as a wiring harness. The development of the electronic system can be performed utilizing a platform design flow that includes multiple design stages, each representing the electronic system at a different level of abstraction.

The platform design flow can initially describe the electronic system as a set of requirements 301, for example, aspects, objectives, high-level operations, or the like, for the electronic system. The requirements 301 can be converted into a functional design 302, which can functionally describe the electronic system. The platform design flow continues by generating a logical design 303 for the electronic system. The logical design 303 can describe the connectivity and devices capable of implementing the functionality of the electronic system, for example, specified as a netlist or the like. The platform design flow can then include a physical design 304 that, in a wiring harness example, can describe the wires and components to physically implement the logical design 303. The platform design flow can then include a manufacturing design 305 that, in a wiring harness example, can describe specific harness components, such as mechanical structures, connectors, wire splices, or the like, as well as manufacturing aids, such as form boards, manufacturing tools, or the like. The platform design flow can include documentation 306 to describe manufacturing instructions, service or diagnostic information, decommissioning information, or the like, for the electronic system.

The platform design system 300 can include a logical design tool 310 to generate a logical design 303 for the electronic system, for example, based at least in part on the requirements 301 and the functional design 302 for the electronic system. In some embodiments, the logical design 303 can be a netlist for the electronic system, which can describe the connectivity and devices capable of implementing the functionality of the electronic system. The logical design tool 310 can receive the requirements 301 and the functional design 302 from a device external to the platform design system 300 or, in some embodiments, the platform design system 300 can include other tools (not shown) that can build or generate the requirements 301 and the functional design 302 for the electronic system.

The platform design system 300 can include a physical design tool 320 to generate a physical design 304 based, at least in part, on the logical design 303. The physical design 304, in a wiring harness example, can describe the wires and components to physically implement the logical design 303.

The platform design system 300 can include a manufacturing design tool 330 to generate a manufacturing design 305 based, at least in part, on the physical design 304. The manufacturing design 305, in the wiring harness example, can describe specific harness components, such as mechanical structures, connectors, wire splices, or the like, as well as manufacturing aids, such as form boards, manufacturing tools, or the like. In some embodiments, the manufacturing design tool 330 can generate a design for a merged form board that corresponds to a combination of multiple form board designs configured for manufacture of different wire harnesses. Embodiments of the manufacturing design tool 330 will be described below in greater detail.

The platform design system 300 can include a documentation design tool 340 to generate a documentation 306 based, at least in part, on the manufacturing design 305. The documentation 306, in the wiring harness example, can describe manufacturing instructions, service or diagnostic information, decommissioning information, or the like, for the electronic system.

Illustrative Form Board Merge Tool

FIG. 4 illustrates an example form board merge tool 400 according to various embodiments. Referring to FIG. 4, the form board merge tool 400 can receive multiple form board designs 401, for example, created by a platform design system that includes development tools, such as a Capital HarnessXC tool, a ModularXC tool, or the like. In some embodiments, each of the form board designs 401 can describe a configuration of a form board that can be utilized to build or manufacture a corresponding wire harness. The form board merge tool 400 can combine the form board designs 401 into a merged form board design 402. The merged form board design 402 can correspond to at least partially overlapping combination of the form board designs 401. The merged form board design 402 can describe a form board configuration that can be utilized to build or manufacture a plurality of different wire harnesses.

Digital continuity of data from the harness designs produced in Capital HarnessXC or ModularXC and which may flow into these tools from other Capital or external applications such as Capital Logic or Capital Integrator can maintained into the merged form board design 402. In other words, the merged form board design 402 generated by the form board merge tool 400 include data linking back to the form board designs 401 and wire harness designs from which they were produced, in order to support design verification and change management.

The form board merge tool 400 can generate the merged form board design 402 by placing one of the form board designs 401 into the merged form board design 402, matching bundles from another form board design 401 to the merged form board design 402, and then placing unmatched bundles into the merged form board design 402. The merged form board design 402 can include links to describe a correspondence between objects in the form board designs 401 and objects in the merged form board design 402, for example, by identifying the objects, object types, the designs 401 and 402, meta-information about the wire harness corresponding to the designs 401 and 402, or the like. These links in the merged form board design 402 can preserve digital continuity between the merged form board design 402 and the form board designs 401, which can enable any subsequent change management. For example, when a change is made to one of the form board designs 401, the links can allow the form board merge tool 400 to identify the merged form board design 402 as possibly being affected by the change and selectively modify the merged form board design 402 based on the change.

The form board merge tool 400 can include a placement unit 411 to place portions of the form board designs 401, such as bundles, connectors, wires, clips, insulation runs, or the like, into the merged form board design 402. The form board merge unit 400 also can maintain an undo queue configured to store previous design states, which can allow the placement unit 411 to reverse previous placement operations with the merged form board design 402.

In some embodiments, the placement unit 411 also can place fixtures in the merged form board design 402, for example, based on fixtures in the form board designs 401. The fixtures can be mechanisms coupled to the form board, which can hold portions of the wire harness, such as bundles, connectors, components, or the like, during manufacture. For example, when the placement unit 411 places a first design of a form board into the merged form board design 402, the placement unit 411 can place portions corresponding to a wire harness and the fixtures to be affixed to the form board. The placement unit 411 can utilize the presence of the fixtures in the merged form board design 402 when subsequently placing portions of a second design of a form board. For example, the placement unit 411 can place the portions of the second design of the form board in portions of the merged form board design 402 without fixtures, which can preserve positions of existing fixtures and corresponding drill points on the merged form board design 402.

The form board merge tool 400 can include a design merging unit 412 to determine how to merge the form board designs 401 into the merged form board design 402. In some embodiments, the design merging unit 412 can utilize one of the form board designs 401 as a base design and then identify portions of another one of the form board designs 401 to merge into the base design. For example, the design merging unit 412 can compare wire bundles in the base design against wire bundles in the other form board designs 401 and identify which of the wire bundles matched each other across the form board designs 401. The design merging unit 412 can indicate to the placement unit 411 which of the wire bundles in the form board designs 401 matched each other, and the placement unit 411 can merge the matched wire bundles in the merged form board design 402 rather than placing them separately from each other in the merged form board design 402.

The design merging unit 412, in some embodiments, can utilize a rules-based approach to compare the wire bundles between the form board designs 401. For example, the design merging unit 412 can perform a rules-based comparison on multiple sections of the form board designs 401 to identify any identical or similar wire bundles across the form board designs 401. The design merging unit 412 also can compare adjacent sections of the form board designs 401 corresponding to any identified wire bundles to determine whether an extended section of the form board designs 401 can be deemed identical or similar. In some embodiments, the design merging unit 412 can recursively search a tree of possible wire bundle extensions to identify one or more extended sections of the form board designs 401 that can be deemed identical or similar. In some embodiments, the design merging unit 412 can select a largest extended section of the form board designs 401 deemed identical or similar, as a matched section of the form board designs 401.

In some embodiments, identical objects, such as bundles or components, can be those objects in the form board designs 401 having no difference. Similar objects, such as bundles or components, can be those objects in the form board designs 401 having a nominal difference, such as a different wire name, connector color, or the like. Different objects, such as bundles or components, can be those objects in the form board designs 401 having a difference, such as a different connector pin out, a difference in bundle length outside tolerance, or the like.

Since some wire harness designs may include hundreds of individual sections, a recursion depth utilized by the design merging unit 412 could approach a thousand nested calls and a number of sections to review for extension could be of the order of a million. The design merging unit 412 may attempt to avoid a stack overflow by limiting a recursion depth to a predetermine threshold value. The design merging unit 412 can generate a map of previously found extended sections, which can allow the design merging unit 412 to prevent repetitive searches. A combination of limiting recursion depth and the previously searched map can allow the design merging unit 412 to perform the extension comparisons more efficiently. To reduce the likelihood of accidental matches between short sections of harness the design merging unit 412 can utilize a context of the surrounding harnesses, for example, the design merging unit 412 can select portions of the wire harnesses to perform the extended searching based on which extended sections of wire harnesses have already been found.

The placement unit 411 also can identify wiring information in the form board designs 401 and, during placement, populate the merged form board design 402 with the wiring information in the form board designs 401. The wiring information can include connections of wire ends, wire attributes, such as cross sectional area, material, part number, wire name, or the like, and/or multicore data associated with the wires. The multicore data can include a multicore part number, which wires are included in the multicore, or the like. In some embodiments, the placement unit 411, in an attempt to avoid duplication of wiring information in the merged form board design 402, can compare the wiring information described in the specifications of the form board designs 401 based on which of the wire bundles or extended sections in the form board designs 401 matched each other. For example, when two wires from the form board designs 401 have same specification and have common wire end locations, the placement unit 411 can populate or modify the merged form board design 402 to represent the two wires as a single wire.

The form board merge tool 400 can include an interface unit 413 to generate a presentation 403 capable of displaying the form board designs 401 and/or the merged form board design 402. The interface unit 413 can receive selections based, at least in part, on the presentation 403, and perform form board merge operations based on the received selections. For example, the interface unit 413 can receive selections of the form board designs 401 to combine into the merged form board design 402, selection of portions of the form board designs 401, such as which wire bundles to place into the merged form board design 402, selection of filtering operations on the presentation 403, or the like.

In some embodiments, the presentation 403 can include selectable sections, such as selectable bundles and components on the form board designs 401 and/or the merged form board design 402, or in a displayed tree of design objects. A selection of a portion of the displayed tree of design objects can prompt the interface unit 413 to alter the presentation 403 to annunciate the selected portion of the displayed tree of design objects in the form board designs 401 and/or the merged form board design 402 portion of the presentation 403. For example, the interface unit 413 can alter the presentation 403 to zoom in on the form board designs 401 and/or the merged form board design 402 to show the selected object.

The interface unit 413 can assign colors to the form board designs 401, which can be utilized in the presentation 403 to visually annunciate which portions of the merged form board design 402 include the form board designs 401. In some embodiments, the interface unit 413 can alter the color of those portions of the form board designs 401 having already been placed in the merged form board design 402, for example, greying the already placed bundles or components of the form board designs 401. Embodiments of the presentation 403 will be described below in FIG. 6 in greater detail.

Figure 5:
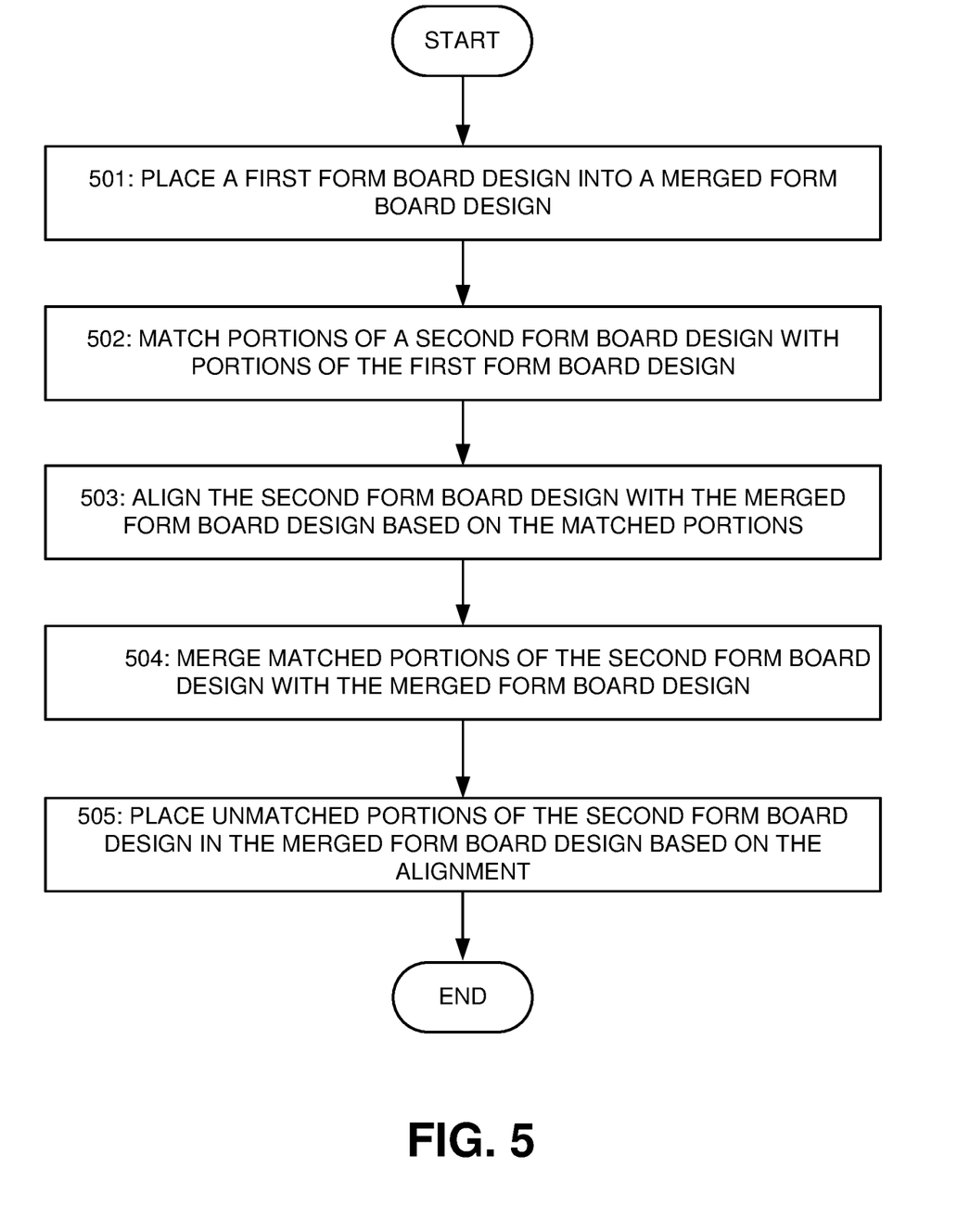
FIG. 5 illustrates a flow chart example of merging form board designs according to various embodiments.

FIG. 5 illustrates a flow chart example of merging form board designs according to various embodiments. Referring to FIG. 5, in a block 501, a computing system implementing a form board merge tool can place a first form board design into a merged form board design. The first form board design can describe a configuration of a form board that can be utilized to build or manufacture a first wire harness. The computing system can place portions of the first form board design, such as bundles, connectors, wires, clips, insulation runs, or the like, into the merged form board design. In some embodiments, the computing system also can place fixtures in the merged form board design, for example, based on fixtures in the first form board designs. The fixtures can be mechanisms coupled to the form board, which can hold portions of the wire harness, such as bundles, connectors, components, or the like, during manufacture.

The placement of the first form board design can populate the merged form board design with links corresponding to portions of the first form board design. The links can identify which portions of the merged form board design correspond to portions of the first form board design. The placement also can populate the merged form board design with wiring information corresponding to the first form board design. The wiring information can include connections of wire ends, wire attributes, such as cross sectional area, material, part number, wire name, or the like, and/or multicore data associated with the wires. The multicore data can include a multicore part number, which wires are included in the multicore, or the like. These links can allow the merged form board design to have data continuity back to the first form board design and possibly to designs for a first wire harness design corresponding to the first form board design.

In a block 502, the computing system implementing the form board merge tool can match portions of a second form board design with portions of the first form board design. The second form board design can describe a configuration of a form board that can be utilized to build or manufacture a second wire harness. The computing system can compare portions of the first form board, such as bundles, connectors, wires, clips, insulation runs, or the like, against portions of the second form board design, such as bundles, connectors, wires, clips, insulation runs, or the like, and identify which of the portions matched each other across the first and second form board designs. In some embodiments, the computing system can receive user input indicative of a match between portions of the first and second form board designs.

In some embodiments, the computing system can utilize a rules-based approach to compare the portions of the first and second form board designs. For example, the computing system can utilize rules to compare multiple sections of the first and second form board designs to identify any identical or similar sections in both the first and second form board designs. After the computing system identifies sections of the first and second form board designs match, in some embodiments, the computing system can attempt to extend the matching sections to determine whether a larger portion of the first and second form board designs match each other. The computing system may compare sections of the first and second form board designs adjacent to the matching sections to determine whether extended sections of the first and second form board designs can be deemed identical or similar. In some embodiments, the computing system can recursively search other sections and/or the already extended sections to identify extended sections of the first and second form board designs that can be deemed identical or similar. In some embodiments, the computing system can select a largest extended section of the first and second form board designs deemed identical or similar, as matched portions of the first and second form board designs.

In a block 503, the computing system implementing the form board merge tool can align the second form board design with the merged form board design based on the matched portions. The computing system can utilize the matched portions of the first and second form board designs to align the second form board design with the merged form board design. In some embodiments, the computing system can identify multiple different possible alignments between the second form board design with the merged form board design based on the matched portions, so the computing system may select one of the possible alignments based on at least one of a quantity of matched portions for each alignment, a largest matched portion for the second form board design for each alignment, a quality of match portions, such as whether the matching was identical or similar, for each alignment.

In a block 504, the computing system implementing the form board merge tool can merge matched portions of the second form board design with the merged form board design. The computing system can generate links in the merged form board design corresponding to portions of the second form board having been matched to the first form board design. These links can identify the portions of the second form board design that correspond to the merged form board, include wiring information of the second form board design, or the like. These links can allow the merged form board design to have data continuity back to the second form board design and possibly to designs for a second wire harness design corresponding to the second form board design.

In a block 505, the computing system implementing the form board merge tool can place unmatched portions of the second form board design in the merged form board design based on the alignment. In some embodiments, the computing system can utilize the presence of the fixtures in the merged form board design when subsequently placing unmatched portions of the second form board design. For example, the computing system can place the unmatched portions of the second form board design in portions of the merged form board design without fixtures, which can preserve positions of existing fixtures and corresponding drill points on the merged form board design.

The computing system can generate links in the merged form board design corresponding to unmatched portions of the second form board. These links can identify the unmatched portions of the second form board design that correspond to the merged form board, include wiring information of the second form board design, or the like. These links can allow the merged form board design to have data continuity back to the second form board design and possibly to designs for a second wire harness design corresponding to the second form board design.

Figure 6:
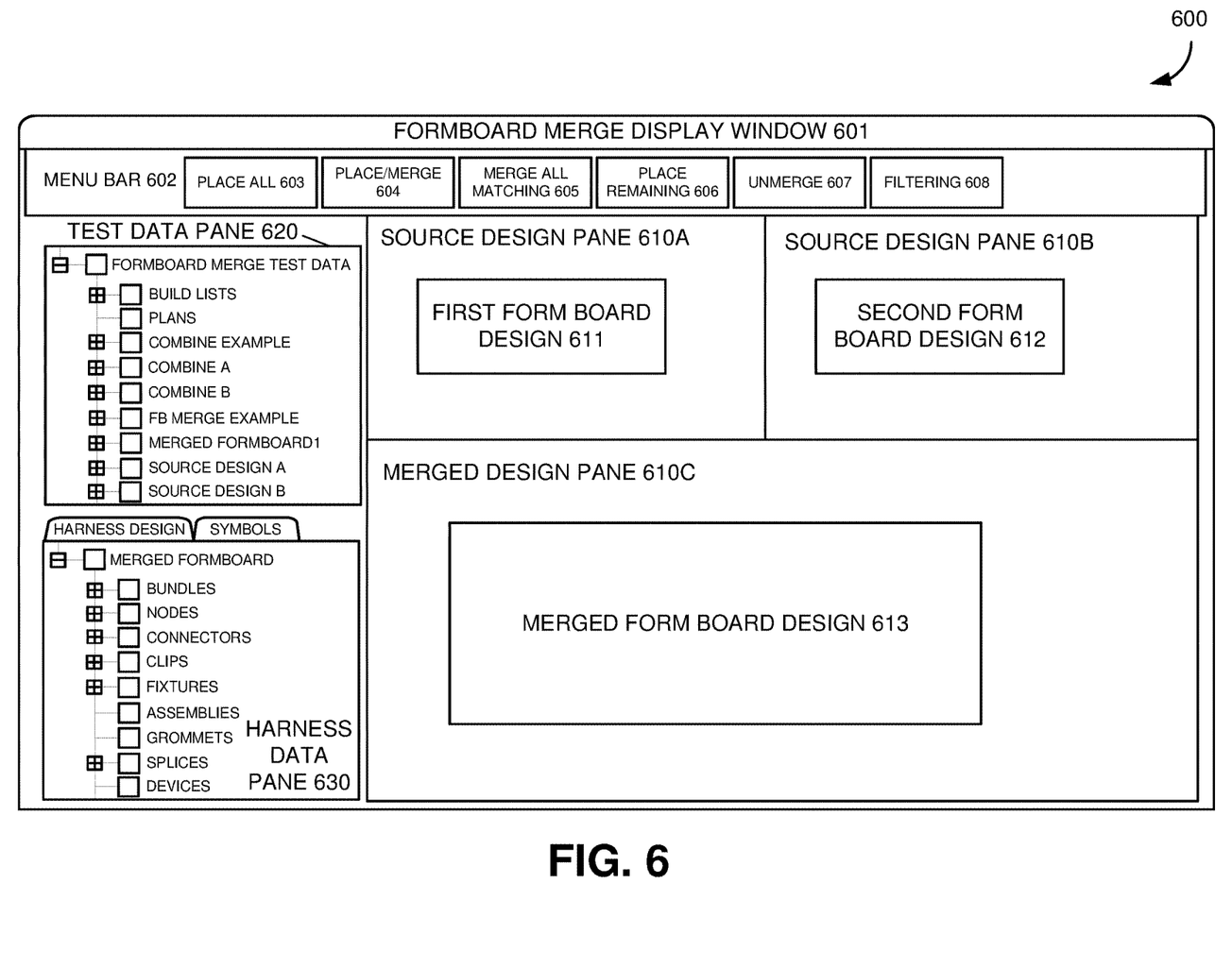
FIG. 6 illustrates an example display presentation for merging form board designs according to various embodiments.

FIG. 6 illustrates an example display presentation for merging form board designs according to various embodiments. Referring to FIG. 6, the display presentation 600 includes a form board merge display window 601 having a plurality of source design panes 610A and 610B. The source design pane 610A can include a presentation of a first form board design 611, which can show a configuration of a form board for use in manufacturing a first wire harness. The source design pane 610B can include a presentation of a second form board design 612, which can show a configuration of a form board for use in manufacturing a second wire harness.

The form board merge display window 601 can include a merged design pane 610C configured to include a presentation of a merged form board design 613. A computing system implementing a form board merge tool can combine the first form board design 611 and the second form board design 612 to generate the merged form board design 613. The merged form board design 613 can correspond to an overlapping combination of the first form board design 611 and the second form board design 612, which can show a configuration of a form board for use in manufacturing both the first wire harness and the second wire harness.

In some embodiments, the first form board design 611 and the second form board design 612 can be assigned colors in the form board merge display window 601, which can be utilized in the source design panes 610A and 610B and the merged design pane 610C to visually annunciate which portions of the merged form board design 613 include the first form board design 611 and the second form board design 612. In some embodiments, portions of the first form board design 611 or portions of the second form board design 612 also can have the assigned color altered, for example, to a grey color, indicating those portions of the first form board design 611 or the portions of the second form board design 612 having already been placed in the merged form board design 613, for example, greying the already placed bundles or components of the first form board design 611 or the second form board design 612.

The form board merge display window 601 can include a test data pane 620 having a selectable tree of form board merge test data. In response to a selection of the form board merge test data in the test data pane 620, the computing system can populate the source design panes 610A and 610B and/or the merged design pane 610C with form board design data. For example, when there has been a selection of source design A, the computing system can populate the source design pane 610A with the first form board design 611 that corresponds to source design A. When a subsequent selection of source design B has been selected, the computing system can populate the source design pane 610B with the second form board design 612 that corresponds to source design B.

The form board merge display window 601 can include a harness data pane 630 having multiple tabs, such as a harness design tab and symbols tab, that, when selected, allows a computing system to present different sets of selectable options in the harness data pane 630. For example, when the harness design tab has been selected, the harness data pane 630 can present a selectable tree of wire harness design data. When a type of wire harness data has been selected in the harness data pane 630, the computing system can prompt the presentation or annunciation of wire harness data in the source design panes 610A and 610B and/or the merged design pane 610C that corresponds to the wire harness associated with the form board designs populated in the panes. Then the symbols tab has been selected, the harness data pane 630 can present a selectable tree of wire harness symbols corresponding to wire harness data. When a particular symbol has been selected in the harness data pane 630, the computing system can prompt the presentation or annunciation of the selected symbol in the source design panes 610A and 610B and/or the merged design pane 610C that corresponds to the wire harness data associated with the symbol.

The form board merge display window 601 can include a menu bar 602, which can include one or more selectable buttons, such as a place all button 603, a place/merge button 604, a merge all matching button 605, a place remaining button 606, and an unmerge button 607. The place all button 603, when selected through the computing system, can prompt the computing system to place sections of the first form board design 611 and/or sections of the second form board design 612 to the merged form board design 613 in a non-overlapping fashion.

The place/merge button 604, when selected through the computing system, can prompt the computing system to place sections of the sections of the first form board design 611 and/or sections of the second form board design 612 having been previously selected in the form board merge display window 601, for example, via user input through the computing system. When the selected sections of the first form board design 611 and/or the second form board design 612 match each other or to sections in the merged form board design 613, the computing system can merge the selected sections in the merged form board design 613.

The merge all matching button 605, when selected through the computing system, can prompt the computing system to merge the matching sections of the first form board design 611 and/or matching sections of the second form board design 612 with matched sections of the merged form board design 613. The computing system can merge the sections, in some embodiments, by adding links to matching sections of the merge form board design 613 that associate back to the matching sections of the first form board design 611 and/or matching sections of the second form board design 612.

The place remaining button 606, when selected through the computing system, can prompt the computing system to place any unplaced or unmerged sections of the first form board design 611 and/or the second form board design 612 to the merged form board design 613 in a non-overlapping fashion.

The unmerge button 607, when selected through the computing system, can prompt the computing system to reverse a previously performed merge operation, for example, deleting the link in the merged form board design 613 corresponding to unmerge operation. In some embodiments, the computing system can reverse the immediately prior merge operation performed or reverse a prior merge operation performed on a selected section of the merged form board design 613.

The menu bar 602 also can include a filtering section 608 having one or more selectable controls, such as radio buttons, slide bars, or the like, to filter the first and second form board designs 611 and 612 in the source design panes 610A and 610B, respectively, and/or the merged form board design 613 in the merged design pane 610C. The controls in the filtering section 608, when selected, can prompt the computing system to hide form board design components, such as bundles, connectors, wires, clips, insulation runs, or the like, in the first and second form board designs 611 and 612 in the source design panes 610A and 610B, respectively, and/or merged form board design 613 in the merged design pane 610C other than the fixtures. In some embodiments, the display presentation 600 can be modified to reduced visual clutter in other ways, such as by filtering first and second form board designs 611 and 612 to dim out categories of diagram objects, for example, through a slider which controls the degree of dimming applied to non-selected categories of item.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to computing processes, it should be appreciated that various examples of the invention may be implemented using any desired combination of computing processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
placing, by a computing system, a first form board design into a merged form board design, wherein the first form board design describes a form board configuration for use in manufacturing a first wire harness;
aligning, by the computing system, a second form board design with the merged form board design based, at least in part, on matches between portions of the second form board design and the first form board design, wherein the second form board design describes a form board configuration for use in manufacturing a second wire harness; and
placing, by the computing system, an unmatched portion of the second form board design in the merged form board design based, at least in part, on the alignment of the second form board design with the merged form board design, wherein the merged form board design describes a form board configuration having an overlapping combination of the first form board design and the second form board design for use in manufacturing both the first wire harness and the second wire harness.

2. The method of claim 1, wherein aligning the second form board design with the merged form board design further comprises:
matching portions of the second form board design to portions of the first form board design; and
merging the matched portions of the second form board design with the merged form board design.

3. The method of claim 2, wherein matching the portions of the second form board design to the portions of the first form board design further comprises:
comparing a section of the first form board design to the second form board design;
when, based on the comparison, the section of the first form board design matches a section of the second form board design, comparing adjacent sections of the first form board design and the second form board design to identify an extended matched section of the second form board design; and
utilizing the extended matched section to correlate the second form board design to the merged form board design.

4. The method of claim 1, wherein placing the first form board design into the merged form board design further comprises populating the merged form board design with wiring information from the first form board design, wherein the wiring information includes at least one of wire ends, wire attributes, or multicore data associated with wires.

5. The method of claim 1, further comprising displaying, by the computing system in a display window, a presentation that includes the first form board design, the second form board design, and the merged form board design, wherein the presentation visually annunciates portions of the merged form board design that correspond the first form board design and the second form board design.

6. The method of claim 1, wherein placing the first form board design into the merged form board design further comprises inserting links into the merged form board design to identify a correspondence between the first form board design and the merged form board design.

7. The method of claim 1, wherein the portions of the first form board design and the portions of the second form board design include at least one of a wire bundle, a connector, a wire, a clip, insulation, a run, a grommet, tape, a fixture, or a splice.

8. A system comprising:
a memory device configured to store machine-readable instructions; and
a computing system including one or more processing devices, in response to executing the machine-readable instructions, configured to:
place a first form board design into a merged form board design, wherein the first form board design describes a form board configuration for use in manufacturing a first wire harness;
align a second form board design with the merged form board design based, at least in part, on matches between portions of the second form board design and the first form board design, wherein the second form board design describes a form board configuration for use in manufacturing a second wire harness; and
place an unmatched portion of the second form board design in the merged form board design based, at least in part, on the alignment of the second form board design with the merged form board design, wherein the merged form board design describes a form board configuration having an overlapping combination of the first form board design and the second form board design for use in manufacturing both the first wire harness and the second wire harness.

9. The system of claim 8, wherein the one or more processing devices, in response to executing the machine-readable instructions, are configured to align the second form board design with the merged form board design by
matching portions of the second form board design to portions of the first form board design; and
merging the matched portions of the second form board design with the merged form board design.

10. The system of claim 9, wherein the one or more processing devices, in response to executing the machine-readable instructions, are configured to match the portions of the second form board design to the portions of the first form board design by:
comparing a section of the first form board design to the second form board design;
when, based on the comparison, the section of the first form board design matches a section of the second form board design, comparing adjacent sections of the first form board design and the second form board design to identify an extended matched section of the second form board design; and utilizing the extended matched section to correlate the second form board design to the merged form board design.

11. The system of claim 8, wherein the one or more processing devices, in response to executing the machine-readable instructions, are configured to populate the merged form board design with wiring information for the placed portions from the first form board design, wherein the wiring information includes at least one of wire ends, wire attributes, or multicore data associated with wires.

12. The system of claim 8, wherein the one or more processing devices, in response to executing the machine-readable instructions, are configured to display, in a display window, a presentation that includes the first form board design, the second form board design, and the merged form board design, wherein the presentation visually annunciates portions of the merged form board design that correspond the first form board design and the second form board design.

13. The system of claim 8, wherein the one or more processing devices, in response to executing the machine-readable instructions, are configured to insert links into the merged form board design to identify a correspondence between the first form board design and the merged form board design.

14. An apparatus including a non-transitory memory device storing instructions configured to cause one or more processing devices to perform operations comprising:

placing a first form board design into a merged form board design, wherein the first form board design describes a form board configuration for use in manufacturing a first wire harness;

aligning a second form board design with the merged form board design based, at least in part, on matches between portions of the second form board design and the first form board design, wherein the second form board design describes a form board configuration for use in manufacturing a second wire harness; and placing an unmatched portion of the second form board design in the merged form board design based, at least in part, on the alignment of the second form board design with the merged form board design, wherein the merged form board design describes a form board configuration having an overlapping combination of the first form board design and the second form board design for use in manufacturing both the first wire harness and the second wire harness.

15. The apparatus of claim 14, wherein the instructions are configured to cause one or more processing devices to perform operations further comprising:

matching portions of the second form board design to the portions of the first form board design; and merging the matched portions of the second form board design with the merged form board design.

16. The apparatus of claim 14, wherein the instructions are configured to cause one or more processing devices to perform operations further comprising:

comparing a section of the first form board design to the second form board design;

when, based on the comparison, the section of the first form board design matches a section of the second form board design, comparing adjacent sections of the first form board design and the second form board design to identify an extended matched section of the second form board design; and utilizing the extended matched section to correlate the second form board design to the merged form board design.

17. The apparatus of claim 14, wherein the instructions are configured to cause one or more processing devices to perform operations further comprising populating the merged form board design with wiring information for the placed portions from the first form board design, wherein the wiring information includes at least one of wire ends, wire attributes, or multicore data associated with wires.

18. The apparatus of claim 14, wherein the instructions are configured to cause one or more processing devices to perform operations further comprising displaying, in a display window, a presentation that includes the first form board design, the second form board design, and the merged form board design, wherein the presentation visually annunciates portions of the merged form board design that correspond the first form board design and the second form board design.

19. The apparatus of claim 14, wherein the instructions are configured to cause one or more processing devices to perform operations further comprising inserting links into the merged form board design to identify a correspondence between the first form board design and the merged form board design.

20. The apparatus of claim 14, wherein the portions of the first form board design and the portions of the second form board design include at least one of a wire bundle, a connector, a wire, a clip, insulation, a run, a grommet, tape, a fixture, or a splice.

* * * * *